(12) United States Patent
Otaki

(10) Patent No.: US 8,687,179 B2
(45) Date of Patent: Apr. 1, 2014

(54) WAVEFRONT ABERRATION MEASURING APPARATUS

(71) Applicant: Nikon Corporation, Tokyo (JP)

(72) Inventor: Tatsuro Otaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/022,762

(22) Filed: Sep. 10, 2013

(65) Prior Publication Data

US 2014/0009753 A1    Jan. 9, 2014

Related U.S. Application Data

(60) Division of application No. 13/645,676, filed on Oct. 5, 2012, now Pat. No. 8,558,996, which is a continuation of application No. PCT/JP2011/058509, filed on Apr. 4, 2011.

(30) Foreign Application Priority Data

Apr. 5, 2010  (JP) .................................. 2010-087351

(51) Int. Cl.
*G01B 9/00* (2006.01)

(52) U.S. Cl.
USPC .......................................... 356/124; 356/126

(58) Field of Classification Search
USPC ................... 356/123–127, 121; 359/558–559; 250/201.9, 201.1
See application file for complete search history.

(56) References Cited

U.S. PATENT DOCUMENTS

| 5,929,970 A | 7/1999 | Mihashi |
| 6,548,797 B1 | 4/2003 | Ai |
| 8,044,331 B2 | 10/2011 | Ohara et al. |

FOREIGN PATENT DOCUMENTS

| JP | 11-28188 A | 2/1999 |
| JP | 2005-098933 A | 4/2005 |
| JP | 2009-288075 A | 12/2009 |

OTHER PUBLICATIONS

Tsuruta, Tadao, *Pencil of Rays*, vol. 4, Singijutsu Communications, 1997, p. 212.
English translation of International Preliminary Report on Patentability for International Patent Application No. PCT/JP2011/058509, Nov. 13, 2012.

*Primary Examiner* — Tri T Ton
(74) *Attorney, Agent, or Firm* — Miles & Stockbridge P.C.

(57) ABSTRACT

A wavefront aberration measuring apparatus comprising: an illumination optical system provided to an incident side of a test lens; and a measuring optical system provided to an exit side of the test lens, the illumination optical system including an aperture stop capable of being opened and closed, and the illumination optical system being movable along an optical axis of the illumination optical system so as to adjust positions of the aperture stop and an entrance pupil of the test lens to have an optically conjugate relation with each other. Accordingly, it becomes possible to provide a wavefront aberration measuring apparatus capable of suppressing errors in measured result.

11 Claims, 5 Drawing Sheets

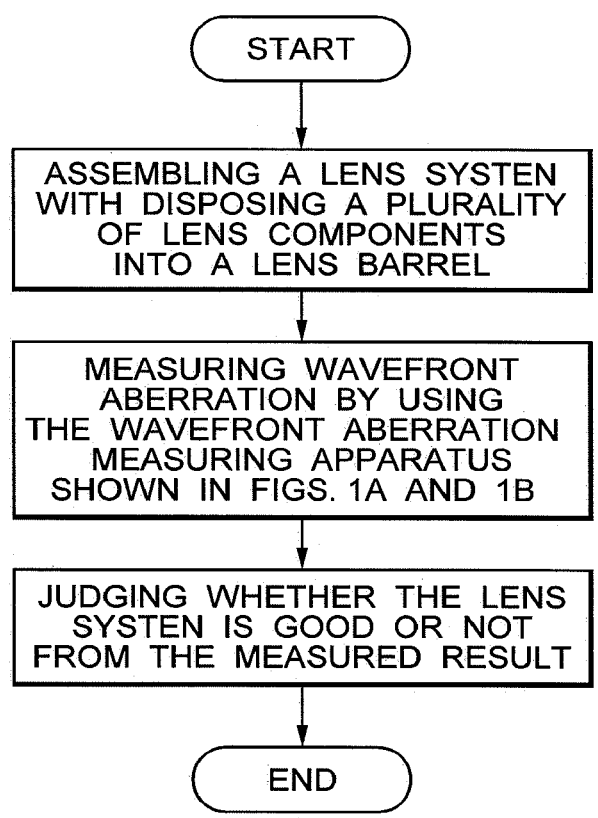

US 8,687,179 B2

WAVEFRONT ABERRATION MEASURING APPARATUS

TECHNICAL FIELD

The present invention relates to a wavefront aberration measuring apparatus used for measuring wavefront aberration of a lens to be measured.

BACKGROUND ART

There has been known a Shack-Hartmann sensor as a method for measuring wavefront aberration. For example, there is an explanation as a representative case of a wavefront measuring sensor in Tsuruta, Tadao, *Pencil of Rays Vol. 4*, Singijutsu Communications, 1997, p. 212.

In an optical system of a wavefront aberration measuring apparatus for measuring wavefront aberration generated in a test lens, an illumination optical system that illuminates the test lens with a bundle of rays and a measuring optical system that measures wavefront aberration of the bundle of rays are generally used.

In the measuring optical system, upon analyzing wavefront aberration generated by the test lens, a shape of a projected aperture has to be known. Accordingly, an aperture stop of the test lens is projected to be measured the shape thereof. In this instance, in order to derive the center of the aperture stop, the shape and the position of the aperture stop may be measured with fully stopping down the aperture stop.

DISCLOSURE OF THE INVENTION

Problems to be Solved by the Invention

However, upon operating the aperture stop in the test lens to fully stop down, the center of gravity of the test lens is shifted or an effect of deformation of the lens portion is generated upon driving the aperture stop, so that there is a possibility that errors are generated in measured result of the shape and the position of the projected aperture stop. As a result, there is a possibility that errors may be generated in the measured result of wavefront aberration.

The present invention is made in view of the above-mentioned problems, and has an object to provide a wavefront aberration measuring apparatus capable of suppressing errors in the measured result.

Way to Solve the Problems

According to a first aspect of the present invention, there is provided a wavefront aberration measuring apparatus comprising: an illumination optical system provided to an incident side of a test lens; and a measuring optical system provided to an exit side of the test lens, the illumination optical system including an aperture stop capable of being opened and closed, and the illumination optical system being movable along an optical axis of the illumination optical system so as to adjust positions of the aperture stop and an entrance pupil of the test lens to have an optically conjugate relation with each other.

According to a second aspect of the present invention, there is provided a wavefront aberration measuring apparatus comprising: an illumination optical system provided to an incident side of a test lens; and a measuring optical system provided to an exit side of the test lens, the illumination optical system including an aperture stop capable of being opened and closed, and the measuring optical system and the test lens being movable along an optical axis of the test lens so as to adjust positions of the aperture stop and an entrance pupil of the test lens to have an optically conjugate relation with each other.

According to a third aspect of the present invention, there is provided a method for manufacturing a lens system having a plurality of lens components, the method comprising steps of: assembling the lens system with disposing the plurality of lens components into a lens barrel; measuring wavefront aberration of the assembled lens system by means of the wavefront aberration measuring apparatus according to the first aspect; and judging whether the lens system is good or not from the measured result.

Effect of the Present Invention

The present invention makes it possible to provide a wavefront aberration measuring apparatus capable of suppressing errors in measured result.

BRIEF DESCRIPTION OF THE DRAWINGS

FIGS. 1A and 1B are drawings showing a wavefront aberration measuring apparatus according to an embodiment of the present invention, in which FIG. 1A shows a state before adjusting to an optically conjugate relation, and FIG. 1B shows a state after adjusting to the optically conjugate relation.

FIGS. 2A and 2B are views showing in detail of the adjustment shown in FIGS. 1A and 1B, in which FIG. 2A shows a state before adjusting to an optically conjugate relation, and FIG. 2B shows a state after the adjustment.

FIGS. 3A and 3B are drawings showing a wavefront aberration measuring apparatus according to another embodiment of the present invention, in which FIG. 3A shows a state before adjusting to an optically conjugate relation, and FIG. 3B shows a state after adjusting to the optically conjugate relation.

FIG. 5 is a flowchart explaining an outline of a method for manufacturing a lens system according to the present invention.

MODES FOR CARRYING OUT THE INVENTION

Then, a wavefront aberration measuring apparatus is further explained in detail with reference to drawings according to an embodiment of the present invention. Incidentally, mechanical and electrical drawings with respect to driving portions are omitted as a matter of convenience. Moreover, a portion having the same function is attached the same reference number, and duplicated explanations are omitted.

Figure 1A:
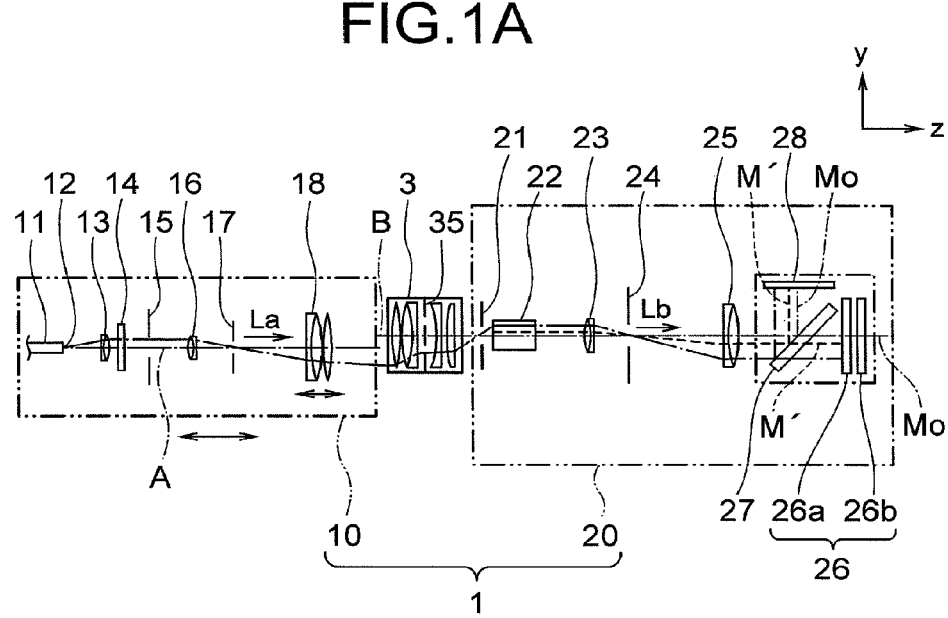
Figure 1B:
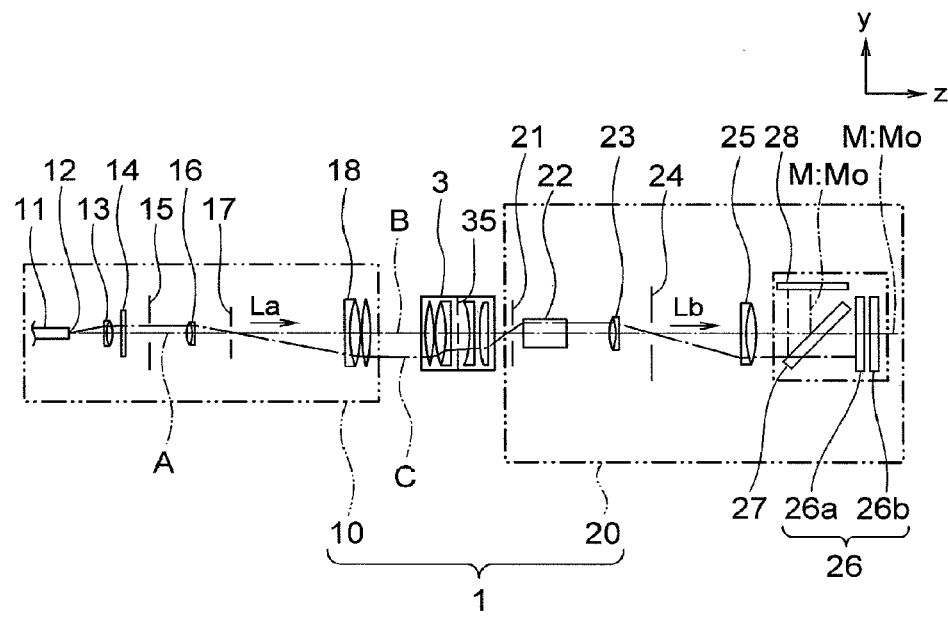

FIGS. 1A and 1B show a wavefront aberration measuring apparatus 1 according to an embodiment. The wavefront aberration measuring apparatus 1 is composed of an illumination optical system 10 and a measuring optical system 20. A test lens 3 to be measured is disposed between the illumination optical system 10 and the measuring optical system 20, and wavefront aberration of the test lens 3 is measured.

The illumination optical system 10 is composed of a light source 12 guided by an optical fiber 11, a lens 13, a filter 14, an aperture stop 15, a lens 16, a stop 17, and a projection lens 18, and disposed linearly to an incident side of the test lens 3. The illumination optical system 10 is movable along an optical axis A. Moreover, the projection lens 18 is movable along the optical axis A. The aperture stop 15 is provided vertically to the optical axis A, and able to be opened and closed. The diameter of the aperture stop 15 can be set arbitrary.

The stop 17 is disposed to a front focal point of the projection lens 18. A rear focal point of the projection lens 18 coincides with an entrance pupil of the test lens 3. Moreover, the aperture stop 15 is disposed to a front focal point of the lens 16. The stop 17 is disposed to a rear focal point of the lens 16. Furthermore, the aperture stop 15 is disposed to a rear focal Point of the lens 13. Accordingly, the aperture stop 15 and the entrance pupil of the test lens 3 become an optically conjugate relation, so that an image (a virtual image) of the stop 17 is formed on a position of an image plane stop 21 described later by the test lens 3. Incidentally, the entrance pupil of the test lens 3 comes to a position where an aperture stop 35 of the test lens 3 is optically projected. Moreover, the aperture stop 35 of the test lens 3 is remained open.

The measuring optical system 20 is composed of the image plane stop 21, an objective lens 22, a first relay lens 23, a filter stop 24, a second relay lens 25, a Shack-Hartmann wavefront sensor 26, a change mirror 27, and an imaging device 28, and these components are disposed linearly to an exit side of the test lens 3.

The wavefront sensor 26 is composed of a multi-lens array 26a and an imaging device 26b. The multi-lens array 26a is constructed by arranging a large number of lens elements (not shown) adjoining two-dimensionally. Each minute aperture (not shown) of each lens element is disposed perpendicularly to the optical axis A. Each minute aperture of each lens element has positive refractive power, and is formed with, for example, a quadrilateral whose outer circumference has four sides. A sectional view of the lens element parallel to the optical axis has a convex shape projecting on only the incident surface side over entire surface of the minute aperture, and the outer circumference of the lens element is formed by curved lines. One pair of opposite sides of the outer circumference is composed of a convex arc toward outside and a concave arc toward inside, and the other pair of opposite sides of the outer circumference is composed of a convex arc toward outside and a concave arc toward inside. In this manner, the multi-lens array 26a is constructed by arranging a large number of lens elements having the same shape adjoining two-dimensionally, so that each element adjoins with no gap. The imaging device 26b is constructed by charge coupled devices (CCD), and is disposed on the focal point of the multi-lens array 26a.

Since the optical path can be changed by a right angle by means of the change mirror 27, the multi-lens array 26a and the imaging device 28 are optically conjugate positions. The filter stop 24 suitably limits frequency of the bundle of rays.

Figure 4:
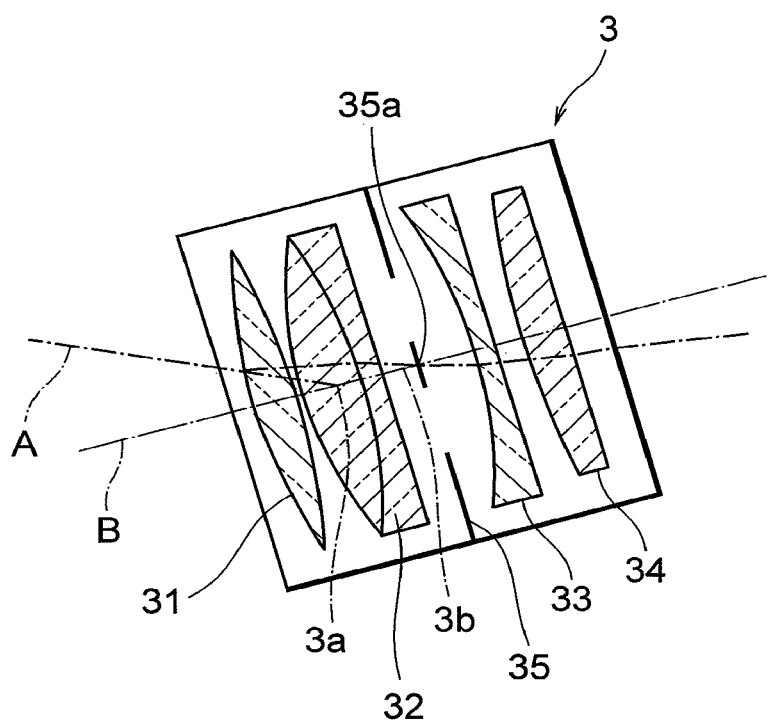
FIG. 4 is an enlarged view showing the test lens 3 shown in FIGS. 3A and 3B.

As shown in detail in FIG. 4, the test lens 3 is constructed by a lens group composed of a number of lenses 31, 32, 33, and 34, and includes an aperture stop 35. In FIG. 4, A denotes a principal ray of the incident light, B denotes the optical axis of the lens group composed of lenses 31 through 34, 3a denotes the center of the entrance pupil of the test lens 3, 3b denotes the center of an exit pupil of the test lens 3, and 35a denotes the center of the aperture stop.

In the illumination optical system 10, light wave La of the bundle of rays is collimated by the lens 13, adjusted the dimension of the aperture by the aperture stop 15, converged by the lens 16, and illuminates the stop 17. The light wave La illuminating the stop 17 is incident on the test lens 3 through the projection lens 18, and forms an image of the stop 17 on the position of the image plane stop 21. The light wave Lb incident on the measuring optical system 20 is collimated to the parallel rays by the objective lens 22, expanded by the first relay lens 23 and the second relay lens 25, and projected on the wavefront sensor 26. An intermediate image plane is formed between the first relay lens 23 and the second relay lens 25, but the frequency of the bundle of rays is suitably limited by the filter stop 24.

In the wavefront sensor 26, the light wave is dividedly converged by the multi-lens array 26a. Each of the dividedly converged light wave Lb is formed an image at a position corresponding to wavefront aberration, and each imaged position M of the multi-lens array 26a is measured by the imaging device 26b. The measured data is stored in a data memory (not shown), analyzed by an analyzer (not shown), and displayed on a display (not shown).

Incidentally, the aperture stop 15 shown in FIG. 1A is not in a position where the aperture stop 35 of the test lens 3 is optically conjugate with. As a result, after passing through the test lens 3, the light wave La is incident on the measuring optical system 20 with including wavefront aberrations generated by the projection lens 18 and the test lens 3. Accordingly, the imaged position measured by the imaging device 26b is shown by wavefront aberration M' shifted from an ideal wavefront M0. However, the shift amount does not precisely show wavefront aberration of the test lens 3.

Figure 2A:
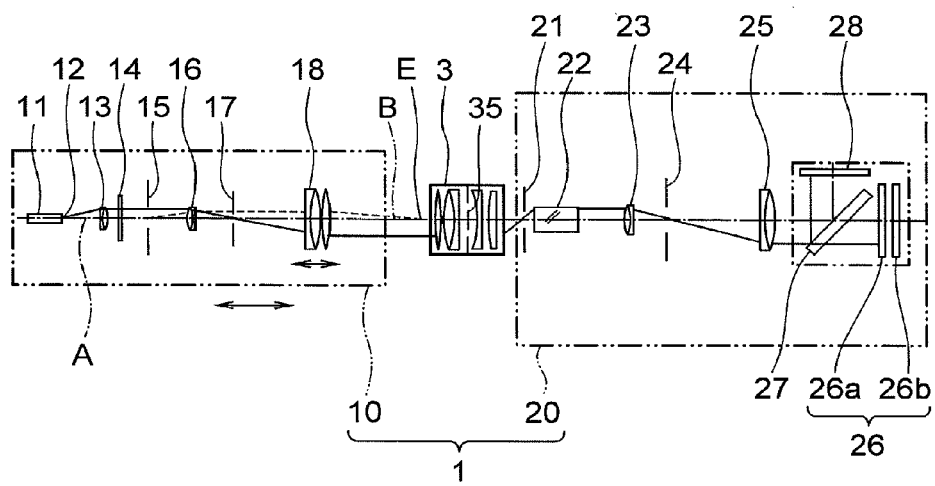
Figure 2B:
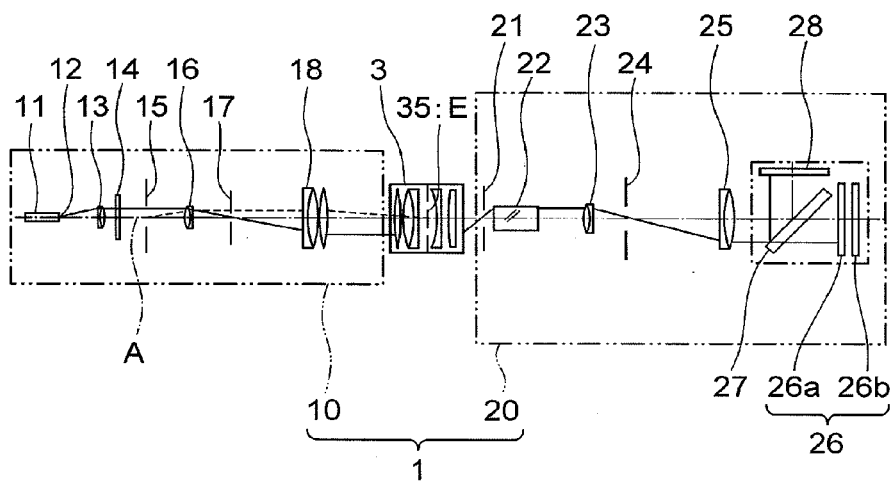

In order to correct the above-described shift amount, the position of the projected stop 17 has to be adjusted to the center of the exit pupil of the projection lens 18. FIG. 2 shows this adjustment in detail. As shown in FIG. 2A, after determining the projection position with moving the projection lens 18 along the optical axis A, the whole of the illumination optical system 10 is moved along the optical axis A such that the exit pupil E of the projection lens 18 comes to the entrance pupil 35 of the test lens 3 as shown in FIG. 2B. In this instance, the whole of the illumination optical system 10 may be move in a direction perpendicular to the optical axis A when necessary. Accordingly, the aperture stop 15 can be adjusted to the position optically conjugate with the test lens 3. This state is shown in FIGS. 1B and 2B. In this case, the imaged position M of the light wave Lb passed through the test lens 3 coincides with the ideal wavefront M0. Accordingly, wavefront aberration generated to the light wave La incident on the test lens 3 along the optical axis A can be measured. Incidentally, in FIG. 1B, C denotes the outer most bundle of rays limited by the aperture stop 15.

In order to precisely detect the center M of the bundle of rays of the light wave Lb, the aperture stop 15 is stopped down. Then, the image of the aperture stop 15 is imaged by the imaging device 28 so as to precisely grasp the shape and the position thereof. Accordingly, the center M of the bundle of rays can be precisely obtained without stopping down the aperture stop 35 of the test lens 3. As a result, wavefront aberration can be measured with suppressing errors in the measured result.

Figure 3A:
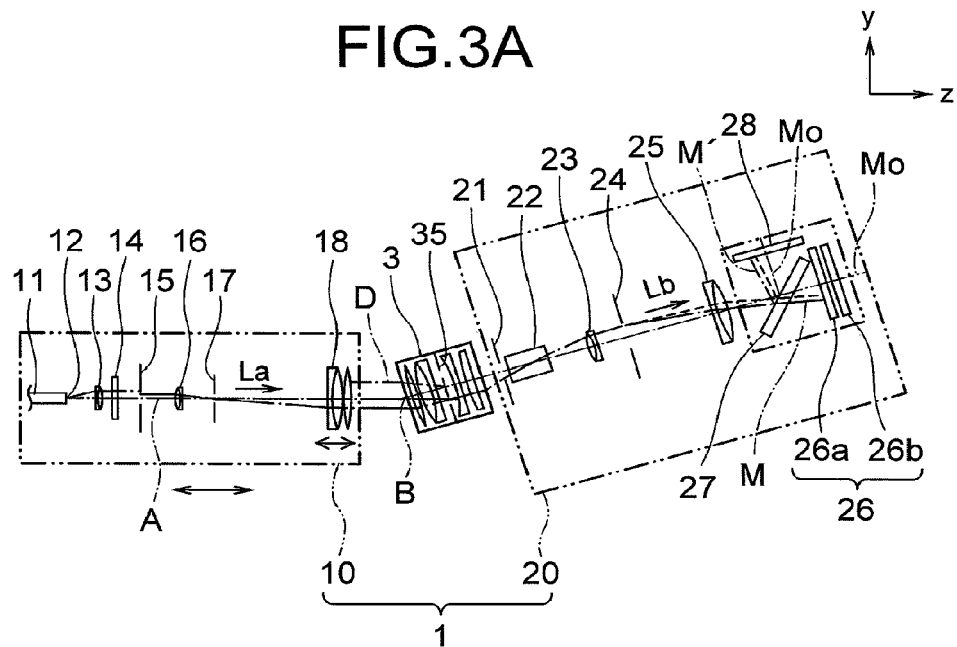
Figure 3B:
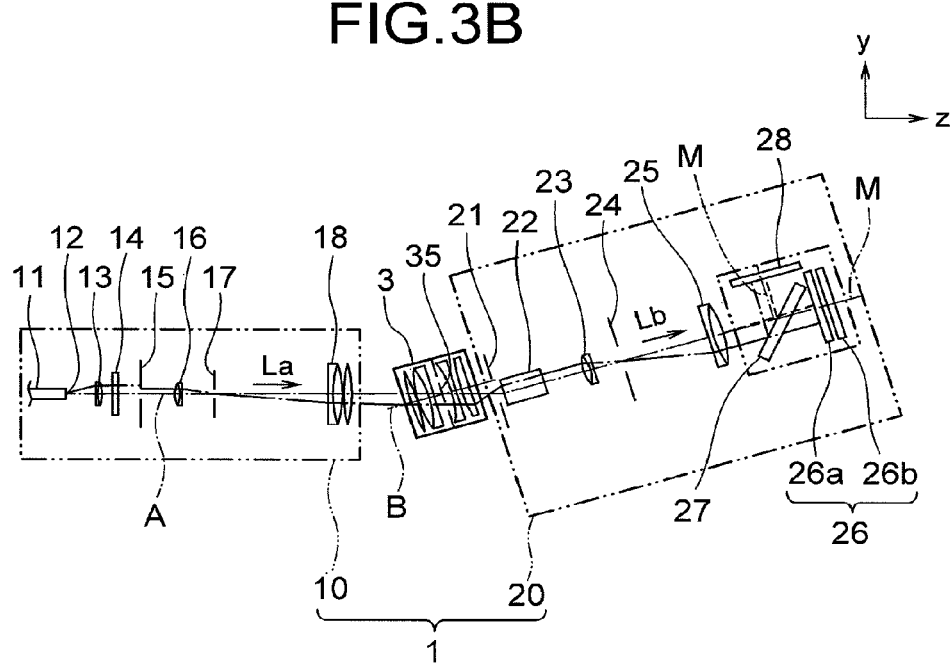

FIGS. 3A and 3B are drawings showing a wavefront aberration measuring apparatus 1 according to another embodiment, in which a case where wavefront aberration of a bundle of rays incident on the test lens 3 in a direction inclined with respect to the optical axis B of the test lens 3 is measured is shown. In this case, since the measuring optical system 20 is disposed with inclining with respect to the optical axis A, the center 3a of the entrance pupil of the test lens 3, which is an intersection of the optical axis A of the illumination optical system 10 and the optical axis B of the test lens 3, and the center 3b of the exit pupil of the test lens 3 are shifted in the optical axis B direction of the test lens 3, as shown in FIG. 4. The others are the same as the embodiment shown in FIG. 1, so that explanations are omitted. Incidentally, in FIG. 3A, D denotes the center of the bundle of rays proceeding to the entrance pupil of the test lens 3.

The wavefront aberration measuring apparatus is not limited to the above-described embodiment. For example, a component capable of moving may be the measuring optical system 20 instead of the illumination optical system 10. In this case, the illumination optical system 10 is fixed, and only the aperture stop 15 can be opened and closed. The measuring optical system 20 is movable along the optical axis B, and in cooperation with the aperture stop 15 capable of being opened and closed, the aperture stop 15 and the entrance pupil of the test lens 3 are adjusted to the positions optically conjugate with each other. In this case, the wavefront sensor 26 is further made movable along the optical axis B, so that the aperture stop 15 and the entrance pupil of the test lens 3 can be adjusted to the positions optically conjugate with each other.

Moreover, it is conceivable that the wavefront sensor 26 of the measuring optical system 20 is made movable along the optical axis B with respect to the fixed illumination optical system 10 in cooperation with the aperture stop 15 capable of being opened and closed, so that the aperture stop 15 and the entrance pupil of the test lens 3 may be adjusted to optically conjugate positions. In this case also, the illumination optical system 10 may further be made movable along the optical axis A, so that the aperture stop 15 and the entrance pupil of the test lens 3 may be adjusted to the positions optically conjugate with each other.

Moreover, both of the whole or a portion (in particular, the projection lens 18) of the illumination optical system 10, and the whole or a portion (in particular, the wavefront sensor 26) of the measuring optical system 20 are made movable, so that the aperture stop 15 and the entrance pupil of the test lens 3 may be adjusted to optically conjugate positions. In this case, the shape and the position of the entrance pupil can be further precisely measured.

In this manner, the present embodiment makes it possible to measure precise shape and position of the exit pupil of the test lens without moving the aperture stop of the test lens.

Moreover, in a lens for a recent electrified camera, although an electrical movement is necessary to open or close an aperture stop, the present embodiment can omit an external connection and electric circuit for driving.

Moreover, with opening and closing the aperture stop of the illumination optical system and with moving the whole or a portion of the illumination optical system or the whole or a portion of the measuring optical system along the optical axis, it becomes possible to measure the shape and the position of the exit pupil of the test lens.

Moreover, since the aperture stop of the test lens is not necessary to be opened and closed, the measurement becomes further accurate with fewer error factors.

Accordingly, precise shape and position of the exit pupil of the test lens can be measured.

A shape of the lens element composing the multi-lens array 26a is arbitrary. As for an imaging device, other than CCD, an image pickup tube and a complementary metal oxide silicon (CMOS) can be conceivable.

An outline of a method for manufacturing a lens system having a plurality of lens components is explained below with reference to FIG. 5.

At first, the lens system is assembled with disposing a plurality of lens components into a lens barrel. Wavefront aberration of the assembled lens system is measured by means of the wavefront aberration measuring apparatus shown in FIGS. 1A and 1B. Whether the assembled lens system is good or not is judged from the measured result.

The wavefront aberration measuring apparatus according to the present invention can be used for measuring a general optical apparatus such as an objective lens for a telescope, a camera and a microscope.

What is claimed is:

1. A wavefront aberration measuring apparatus comprising:
   an illumination optical system provided to an incident side of a test lens; and
   a measuring optical system provided to an exit side of the test lens,
   the illumination optical system including an aperture stop capable of being opened and closed and a projection lens, and
   the measuring optical system and the test lens being movable along an optical axis of the test lens so as to adjust positions of the aperture stop and an entrance pupil of the test lens to have an optically conjugate relation with each other.

2. The wavefront aberration measuring apparatus according to claim 1, wherein the measuring optical system includes a wavefront sensor that is movable along the optical axis of the test lens.

3. A wavefront aberration measuring apparatus comprising:
   an illumination optical system provided to an incident side of a test lens; and
   a measuring optical system provided to an exit side of the test lens,
   the illumination optical system including an aperture stop capable of being opened and closed and a projection lens, and
   the measuring optical system including a wavefront sensor that is movable along an optical axis of the test lens such that the aperture stop and an entrance pupil of the test lens are adjusted to positions to have optically conjugate relation with each other.

4. The wavefront aberration measuring apparatus according to claim 3, wherein the measuring optical system is movable along the optical axis of the test lens.

5. The wavefront aberration measuring apparatus according to claim 1, further comprising:
   an imaging device being disposed on an optically conjugate position with respect to the aperture stop and the entrance pupil of the test lens.

6. The wavefront aberration measuring apparatus according to claim 1, further comprising:
   a lens array being disposed on an optically conjugate position with respect to the aperture stop and an entrance pupil of the test lens.

7. The wavefront aberration measuring apparatus according to claim 1, wherein the measuring optical system is disposed linearly with respect to the illumination optical system.

8. The wavefront aberration measuring apparatus according to claim 1, wherein the measuring optical system is disposed with inclining with respect to the illumination optical system.

9. A method for manufacturing a lens system having a plurality of lens components, the method comprising steps of:
   assembling the lens system with disposing the plurality of lens components into a lens barrel;
   measuring wavefront aberration of the assembled lens system by means of a wavefront aberration measuring apparatus; and
   judging whether the lens system is good or not from the measured result, wherein the wavefront aberration measuring apparatus comprises:
an illumination optical system provided to an incident side of the lens system; and
a measuring optical system provided to an exit side of the lens system,
the illumination optical system including an aperture stop capable of being opened and closed and a projection lens, and
the illumination optical system being movable along an optical axis of the illumination optical system so as to adjust positions of the aperture stop and an entrance pupil of the lens system to have an optically conjugate relation with each other.

10. A method for manufacturing a lens system having a plurality of lens components, the method comprising steps of:
assembling the lens system with disposing the plurality of lens components into a lens barrel;
measuring wavefront aberration of the assembled lens system by means of a wavefront aberration measuring apparatus; and
judging whether the lens system is good or not from the measured result,
wherein the wavefront aberration measuring apparatus comprises:
an illumination optical system provided to an incident side of a test lens; and
a measuring optical system provided to an exit side of the test lens,
the illumination optical system including an aperture stop capable of being opened and closed and a projection lens, and
the measuring optical system and the test lens being movable along an optical axis of the test lens so as to adjust positions of the aperture stop and an entrance pupil of the test lens to have an optically conjugate relation with each other.

11. A method for manufacturing a lens system having a plurality of lens components, the method comprising steps of:
assembling the lens system with disposing the plurality of lens components into a lens barrel;
measuring wavefront aberration of the assembled lens system by means of a wavefront aberration measuring apparatus; and
judging whether the lens system is good or not from the measured result,
wherein the wavefront aberration measuring apparatus comprises:
an illumination optical system provided to an incident side of a test lens; and
a measuring optical system provided to an exit side of the test lens,
the illumination optical system including an aperture stop capable of being opened and closed and a projection lens, and
the measuring optical system including a wavefront sensor that is movable along an optical axis of the test lens such that the aperture stop and an entrance pupil of the test lens are adjusted to positions to have optically conjugate relation with each other.

\* \* \* \* \*